Figure 1:
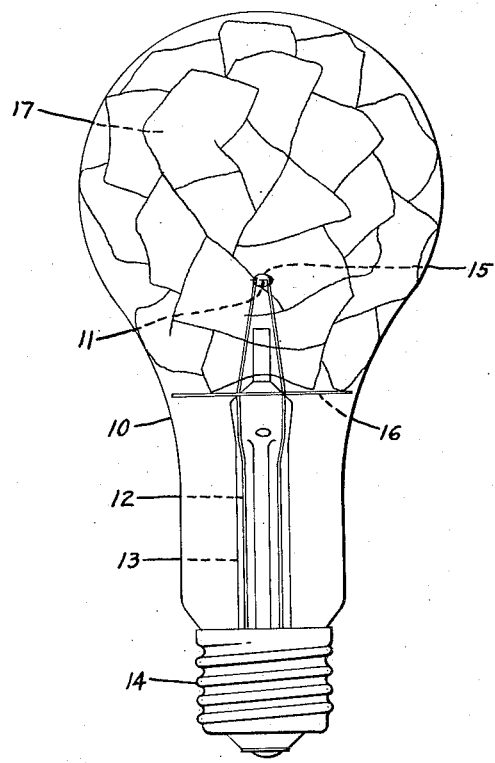

Nov. 8, 1938.   P. O. CARTUN   2,136,234
FLASH LAMP
Filed Nov. 13, 1937   2 Sheets-Sheet 1

Inventor:
Paul O. Cartun,
by Harry E. Dunham
His Attorney.

Patented Nov. 8, 1938

2,136,234

UNITED STATES PATENT OFFICE 2,136,234

FLASH LAMP

Paul O. Cartun, Cleveland Heights, Ohio, assignor to General Electric Company, a corporation of New York Application November 13, 1937, Serial No. 174,419

4 Claims. (Cl. 67—31)

My invention relates to flash lamps and more particularly to that type of flash lamp used for photographic purposes which usually comprises a sealed transparent envelope in which is enclosed a readily combustible material together with a substance, usually a gas filling, which, upon ignition, enters into a reaction with the combustible material with the resulting emission of actinic light.

At present, the combustion material generally used in flash lamps consists of a quantity of extremely thin aluminum foil of a given thickness. To produce illumination of maximum intensity for photographic purposes, the foil has to be very thin, of a thickness of approximately .000010 to .000015 inch. When a lamp containing such a combustible material is flashed, the degree of illumination rises from zero in a quickly rising curve to a sharp peak and then quickly drops down to a low intensity, from which point it gradually tapers off to zero. When taking a photograph at high shutter speed with such a foil flash lamp, it is obviously necessary to operate the shutter of the camera at the high intensity point of the light flash. However, the duration of the actinically effective portion of the flash is so short, usually about .005 to .10 of a second, that means for operating a shutter at the peak of the flash requires delicate and accurate synchronizing mechanism. This condition makes it difficult to obtain the best results, and it is especially necessary to provide flash lamps which will operate exactly alike. This is a difficult problem to contend with from a manufacturing standpoint, particularly since flash lamps are made to sell at a relatively low price and must be produced at a high rate of speed.

Flash lamps containing such extremely thin aluminum foil are also disadvantageous for use with cameras equipped with shutters of the focal plane type for the reason that the duration of the high intensity portion of the flash is appreciably shorter than the time required for the camera shutter slit to travel across the width of the sensitized film. Thus, even though the camera shutter is operated at the peak of the flash, various portions of the sensitized film will be exposed to a different degree of light intensity, thereby resulting in inferior pictures.

Where foil of greater thickness than that mentioned above is employed as the combustible material, the degree of illumination produced by the flash rises (slower than with thin foil) from zero in a slowly rising curve to a peak of maximum intensity, whence it slowly tapers off to zero. A more blunt or broadened peak is thus produced, due to the fact that the thicker foil is slower to ignite, and after ignition, burns at a comparatively slower rate. While the maximum intensity of the flash at the peak thereof is less than in the case of the thinner foil, the blunt or broadened peak is a highly desirable feature, since it provides a greater time interval during which a camera shutter may be operated to expose the sensitized film to a comparatively high degree of illumination. However, the slower start and the relatively long time required for the flash to rise to its broadened peak is undesirable from the standpoint of synchronization of camera shutter opening and flash peak, since considerable delay in shutter opening, after closing of the circuit through the flash lamp, is necessary to effectuate proper synchronization. Furthermore, a considerable portion of the actinic light produced by the flash is wasted during the prolonged period required for such flash to reach its peak. It is therefore evident that the desirable flash would be one which quickly rises from zero to a broadened or flattened peak of relatively high intensity and of prolonged duration.

One object of my invention is to provide a flash lamp which starts quickly and emits a relatively high degree of light for a prolonged period of time.

Another object of my invention is to provide a flash lamp which emits a flash of light characterized by a rapid rise from zero to a broadened peak of maximum intensity, followed by an extended high intensity portion of prolonged duration.

Still another object of my invention is to provide a flash lamp containing combustible light-giving material so arranged within the lamp as to quickly produce a prolonged flash of light.

A further object of the invention is to provide a flash lamp containing combustible material consisting of metal foil of different thicknesses, said foil being so arranged within the lamp as to produce the desired flash of light.

Figure 2:
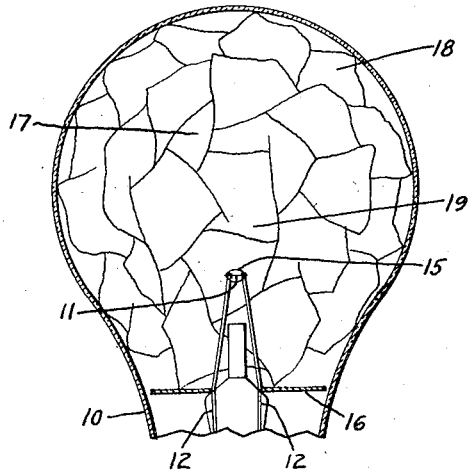
Figure 3:
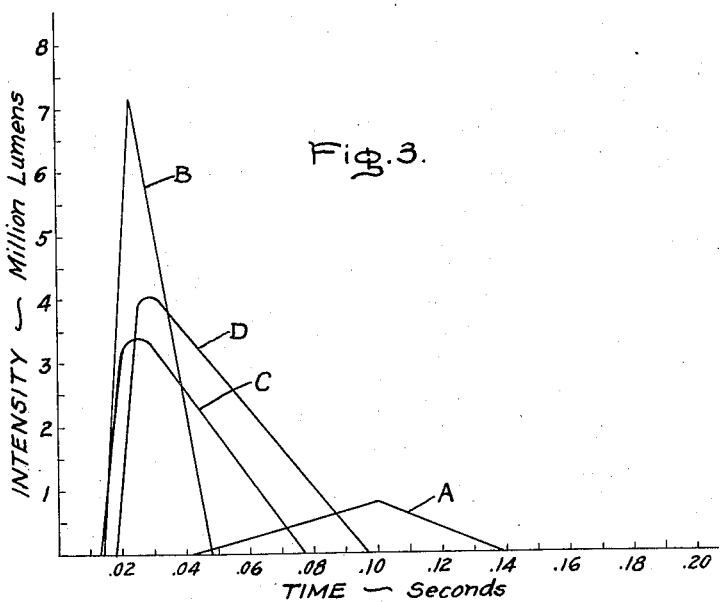
Figure 4:
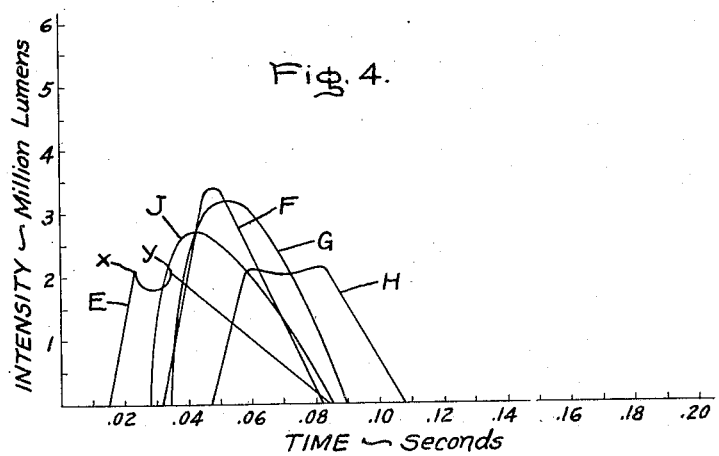

Further objects and advantages of my invention will appear from the following detailed description of species thereof and from the accompanying drawings, in which Fig. 1 is an elevation of a flash lamp comprising my invention; Fig. 2 is a longitudinal sectional view of the lamp shown in Fig. 1; Fig. 3 is a chart showing the time-intensity curves of two lamps each having mixed foils of different thicknesses, and of two other lamps each having foils of a single thickness with the foil thickness different for each lamp; and Fig. 4 is a chart showing the time-intensity curves of modified forms of flash lamps each having mixed foils of different thicknesses.

Referring to Figs. 1 and 2, the lamp there shown comprises a vitreous transparent bulb 10 containing a small filament 11, the ends of which are connected to lead-in wires 12, 12 which extend through a stem 13 to a base 14. The filament 11 is embedded in a fulminating substance 15 to thereby form the ignition means for the lamp. A disc 16, preferably of asbestos, is mounted on the stem 13 to shield the base end of the lamp from the heat of combustion and also to prevent premature ignition of the combustible material during the sealing-in operation. The bulb 10 is loosely filled with a quantity of combustible material 17, consisting of metal foil of different thicknesses and also has a filling of oxygen at a pressure of approximately 180 mm. of mercury. The foil 17 may be either of aluminum and/or magnesium or alloys thereof, such, for instance, as those containing silicon, cerium, or zinc, or any other metal giving a white oxide upon combustion.

From the flash curve A (Fig. 3) of a flash lamp provided with relatively heavy foil approximately 0.000030 inch thick, it is evident that such heavy foil is relatively slow to ignite, as evidenced by the pronounced starting lag, and requires a comparatively long period of time to reach its peak of maximum intensity. In contradistinction thereto, the flash curve B of a flash lamp provided with relatively thin foil, approximately 0.000010 inch thick, shows that such a thin foil ignites quickly and reaches its peak in a relatively short period of time. While the thin foil lamp is characterized by a curve having a very sharp peak of high intensity and provides a flash of light of short duration, the heavy foil lamp has a curve with a more or less blunt or broadened peak of lower intensity and of prolonged duration.

By combining a definite amount of foil of different thicknesses within the bulb 10, I have found that the desirable flash characteristics of both the thin and heavy foil lamps, i. e., quick starting of the flash and prolonged duration of the same, may be imparted to the resulting lamp. Furthermore, by selecting foils of proper thicknesses and arranging the same in a definite manner within the bulb, the flash characteristics of the lamp may be so varied as to give practically any desired time-intensity curve. Thus, three sheets of aluminum foil .000010 inch thick and one sheet .000030 inch thick, each sheet having an area of approximately 27 square inches, will produce either the curve C or D in Fig. 3, depending upon the particular manner in which the said foil is arranged within the bulb. Curve C is produced when the thicker foil 18 (Fig. 2) is inserted first within the bulb, and the thinner foil 19 last so as to immediately surround and lie closely adjacent the fulminating substance 15, while curve D is produced when the arrangement of the foil is the opposite, i. e., when the thicker foil 18 immediately surrounds the fulminating substance 15. From an inspection of these curves it will be seen that the flash of light starts sooner when the thinner foil is placed immediately adjacent the fulminating substance 15. This is undoubtedly due to the fact that the thin foil, being adjacent the fulminating substance 15, ignites much more quickly than the heavier foil when the latter is placed adjacent such fulminating substance.

As previously mentioned in connection with the performance of flash lamps in which all the foil is of one given thickness, the thicker the foil the greater the starting time lag and the slower the rate of combustion of such foil. Thus, though the heavier foil in my improved flash lamp is relatively slow to ignite, the rapid combustion of the thinner foil, in addition to providing the desirable quick start, also serves to accelerate the ignition of such heavier foil. Accordingly, this acceleration causes the flash of light produced by the combustion of the heavier foil to rise more quickly and reach its maximum intensity in a shorter period of time than that ordinarily required by a lamp containing such heavier foil alone. However, the comparatively slow rate of combustion characteristic of such heavier foil results in the production of actinic light of relatively high intensity for a prolonged period of time after the flash of light from the thinner foil has reached its peak, as is evidenced by the slowly tapering end portions of the time-intensity curves C and D.

It will be seen, therefore, that a mixed foil lamp according to my invention provides a source of illumination of the character of a flash which quickly attains its maximum intensity, as in the case of a relatively thin foil lamp, and which furnishes light of comparatively high intensity over a relatively long period, as is characteristic of a heavy foil lamp. Thus the operation of a camera shutter during the high intensity light period is greatly facilitated and the extreme degree of accuracy in synchronization and in the manufacture of uniformly operating lamps, as heretofore required, is not necessary. In addition, the prolonged high intensity light period adapts our mixed foil lamp to use with cameras equipped with focal plane shutters, since the various portions of the sensitized film are more apt to be exposed to light of substantially the same degree of intensity.

A better understanding of the actual effect produced by combining foils of different thicknesses within one lamp may be obtained by referring to curve E in Fig. 4. This curve is the time-intensity curve of a lamp provided with two sheets of aluminum foil .000030 inch thick and two sheets .000010 inch thick, with the two thinner sheets immediately surrounding the fulminating substance. Two distinct peaks, $x$ and $y$, are shown by the curve, the first peak $x$ representing the light intensity at the instant the flash from the thinner foil has attained its maximum intensity, while the second peak $y$ represents the light intensity at the moment the flash from the thicker foil has attained its maximum intensity.

The proportions of thin and heavy foil, and the thicknesses thereof, may be varied to produce the particular flash characteristics desired. Thus, in Fig. 4, curve F denotes the time-intensity curve of a flash lamp provided with three sheets of aluminum foil .000015 inch thick and one sheet .000030 inch thick, the latter sheet lying adjacent to and immediately surrounding the fulminating substance 15, while curve G is the time-intensity curve of a lamp provided with two sheets of foil .000030 inch thick and two sheets .000015 inch thick arranged in alternating layers with one of the thinner sheets immediately surrounding the fulminating substance 15. Both of these curves F and G are characterized by a rounded peak and have a prolonged duration, as in the case of the curves C and D in Fig. 3. The starting lag, however, of the curves F and G is somewhat greater than in the curves C and D.

The curve H in Fig. 4 is the time-intensity curve of a lamp containing three sheets of foil .000030 inch thick and one sheet .000015 inch thick, the latter immediately surrounding the fulminating substance 15. The broadened peak or plateau characteristic of this curve is the desideratum in flash lamps, since the maximum intensity of the flash is of prolonged duration, thereby facilitating the operation of a camera shutter during the period of maximum light intensity and obviating the extreme degree of accuracy in synchronization heretofore required.

Referring again to Fig. 4, very favorable flash characteristics are produced by a combination of aluminum foils of three different thicknesses. Thus, curve J is the time-intensity curve of a flash lamp provided with one sheet of aluminum foil .000030 inch thick, two sheets .000015 inch thick, and one sheet .000010 inch thick, and inserted in that order within the bulb, so that the thinnest sheet immediately surrounds the fulminating substance 15. As is characteristic of curves C to H, curve J also rises quickly to a well-rounded peak and has the desirable prolonged duration.

From the above it is evident that by selecting foils of the proper different thicknesses, and arranging them in a definite manner within the bulb, the desired flash characteristics may be imparted to the flash of light produced by the lamp.

What I claim as new and desire to secure by Letters Patent of the United States is:

1. A flash lamp comprising a sealed container, a combustion supporting atmosphere in said container, and a quantity of combustible material in said container, said combustible material consisting of a plurality of sheets of metal foil of different thicknesses and so arranged within the container as to provide the desired flash characteristics upon combustion.

2. A flash lamp comprising a sealed container, a combustion supporting atmosphere in said container, and a quantity of combustible material in said container, said combustible material consisting of a plurality of sheets of relatively thin metal foil and a sheet of relatively heavy metal foil so arranged within the container as to provide the desired flash characteristics upon combustion.

3. A flash lamp comprising a sealed container, a combustion supporting atmosphere in said container, and a quantity of combustible material in said container, said combustible material consisting of a plurality of sheets of relatively heavy metal foil and a sheet of relatively thin metal foil so arranged within the container as to provide the desired flash characteristics upon combustion.

4. A flash lamp comprising a sealed container, a combustion supporting atmosphere in said container, and a quantity of combustible material in said container, said combustible material consisting of a plurality of sheets of relatively thin metal foil and a plurality of sheets of relatively heavy metal foil arranged in alternate layers within the container to provide the desired flash characteristics upon combustion.

PAUL O. CARTUN.